United States Patent
Ni et al.

(10) Patent No.: US 12,321,215 B2
(45) Date of Patent: Jun. 3, 2025

(54) POWER MANAGEMENT METHOD AND DEVICE

(71) Applicant: HUAWEI TECHNOLOGIES CO., LTD., Guangdong (CN)

(72) Inventors: Binbin Ni, Hangzhou (CN); Dongkuang Song, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 268 days.

(21) Appl. No.: 17/727,686

(22) Filed: Apr. 22, 2022

(65) Prior Publication Data

US 2022/0244772 A1  Aug. 4, 2022

Related U.S. Application Data

(63) Continuation of application No. PCT/CN2020/122459, filed on Oct. 21, 2020.

(30) Foreign Application Priority Data

Oct. 22, 2019 (CN) .......................... 201911007882.3

(51) Int. Cl.
*G06F 1/3296* (2019.01)
*G06F 1/324* (2019.01)
*G06F 1/3287* (2019.01)

(52) U.S. Cl.
CPC ............ *G06F 1/324* (2013.01); *G06F 1/3287* (2013.01); *G06F 1/3296* (2013.01)

(58) Field of Classification Search
CPC ...... G06F 1/324; G06F 1/3287; G06F 1/3296; G06F 1/206; G06F 1/26; G06F 1/3215; G06F 1/3243; G06F 9/4401
See application file for complete search history.

(56) References Cited

U.S. PATENT DOCUMENTS

| 2003/0117759 A1 | 6/2003 | Cooper |
| 2003/0120961 A1 | 6/2003 | Cooper |

(Continued)

FOREIGN PATENT DOCUMENTS

| CN | 101477403 A | 7/2009 |
| CN | 103488532 A | 1/2014 |

(Continued)

*Primary Examiner* — Paul Yen

(57) ABSTRACT

This disclosure discloses a power management method and device, applied to power management of an electronic device. The method includes the following processing: obtaining an IMU PM execution notification before an OS runs, where the IMU PM execution notification is sent by boot firmware after the boot firmware determines, before the OS runs, that power management PM is to be performed by the IMU firmware; after determining, based on the IMU PM execution notification, that PM is to be performed on a CPU obtaining a current performance parameter of the CPU, where the performance parameter includes one or more of power consumption, a temperature, and usage of the CPU (302); and performing power management on the CPU based on the performance parameter (303). Power management is performed so that interaction procedures between the OS and the IMU firmware can be reduced, so that the power management is more efficient.

20 Claims, 5 Drawing Sheets

(56) References Cited

U.S. PATENT DOCUMENTS

| | | | |
|---|---|---|---|
| 2007/0162776 A1 | 7/2007 | Carpenter et al. | |
| 2007/0300055 A1* | 12/2007 | Sip | G06F 9/4401 713/2 |
| 2013/0041513 A1 | 2/2013 | Cox et al. | |
| 2014/0181352 A1* | 6/2014 | Conrad | G06F 1/3206 713/320 |
| 2017/0031425 A1 | 2/2017 | Lin | |
| 2018/0210532 A1 | 7/2018 | Zhang et al. | |
| 2021/0240545 A1* | 8/2021 | Kumar | G06F 9/4406 |

FOREIGN PATENT DOCUMENTS

| | | |
|---|---|---|
| CN | 105677000 A | 6/2016 |
| CN | 108803860 A | 11/2018 |

\* cited by examiner

POWER MANAGEMENT METHOD AND DEVICE

CROSS-REFERENCE TO RELATED DISCLOSURES

This application is a continuation of International Application No. PCT/CN2020/122459, filed on Oct. 21, 2020 which claims priority to Chinese Patent Application No. 201911007882.3, filed on Oct. 22, 2019. The disclosures of the aforementioned applications are hereby incorporated by reference in their entireties.

TECHNICAL FIELD

This disclosure relates to the field of power management technologies, and in particular, to a power management method and device.

BACKGROUND

A server is widely used in enterprises as a device that can provide various services such as data computing, data storage, and data management. The server has more stable performance but has higher management and maintenance costs than a common terminal-side computer device. Costs of power supplied to the server and cooling costs of the server account for a very large part of the management and maintenance costs of the server. Therefore, to reduce the power and cooling costs of the server, effective power management needs to be performed on the server to reduce power consumption and heat generation of the server.

Currently, a relatively common server power management method is to use an operating system (OS) power management (PM) application or routine, OS PM for short. Usually, the OS PM may also be referred to as operating system energy consumption management. A procedure of the OS PM is as follows: An OS monitors usage of a central processing unit (CPU) in real time, and determines a voltage adjustment value and a frequency adjustment value based on the usage and a pre-configured frequency adjustment and voltage adjustment policy; and then, sends a frequency adjustment and voltage adjustment request to intelligent management unit (IMU) firmware. After receiving the frequency adjustment and voltage adjustment request sent by the OS, the IMU firmware obtains the voltage adjustment value and the frequency adjustment value, adjusts a frequency and voltage of the CPU based on the voltage adjustment value and the frequency adjustment value, and feeds back an adjustment completion message to the OS after the adjustment is completed.

In a process of implementing this disclosure, the inventor finds that the related technology has at least the following problem:

The OS PM is initiated by the OS. The IMU firmware needs to be first notified of the OS PM, and then the IMU firmware performs frequency adjustment and voltage adjustment. This adjustment process is cumbersome and has a relatively large latency.

SUMMARY

Embodiments of this disclosure provide a power management method and device, to resolve a problem of a cumbersome adjustment process in related power management. The technical solutions are as follows.

According to a first aspect, a power management method is provided. The method is used for power management of an electronic device. The electronic device includes a central processing unit CPU and a storage, the storage stores a plurality of program instructions respectively corresponding to boot firmware, an operating system OS, and intelligent management unit IMU firmware, the plurality of program instructions are read and executed by the CPU to implement functions of the boot firmware, the OS, and the IMU firmware, and the power management method is performed by the IMU firmware and includes:

obtaining an intelligent management unit power management IMU PM execution notification before the operating system OS runs, where the IMU PM execution notification is sent by the boot firmware after the boot firmware determines, before the OS runs, that power management PM is to be performed by the IMU firmware, and the boot firmware is further configured to prevent, before the OS runs, the OS from performing operating system power management OS PM;

after determining, based on the IMU PM execution notification, that PM is to be performed on the CPU by the IMU firmware, obtaining a current performance parameter of the CPU, where the performance parameter includes one or more of power consumption, a temperature, and usage of the CPU; and performing power management on the CPU based on the performance parameter.

In the solution shown in this embodiment of this disclosure, the IMU PM execution notification is used to notify the IMU firmware to perform power management. The IMU PM execution notification is sent by the boot firmware. A sending occasion may be after the OS is prevented, before the OS runs, from performing OS PM, and therefore the IMU firmware may obtain the IMU PM execution notification after the OS is prevented from performing OS PM. After receiving the IMU PM execution notification, the IMU firmware enables IMU PM. The IMU firmware may periodically obtain a real-time performance parameter of the CPU, such as power consumption, a temperature, and usage, and then adjust a frequency and voltage of the CPU based on the obtained performance parameter, to implement power management. In the foregoing process, the performance parameter obtaining and the CPU frequency and voltage adjustment are both directly implemented by the IMU firmware, without a need to interact with the OS, thereby reducing a CPU adjustment latency.

In a possible implementation, the IMU PM execution notification is an IMU PM execution instruction, and the obtaining an IMU PM execution notification includes:

receiving the IMU PM execution instruction sent by the boot firmware.

In the solution shown in this embodiment of this disclosure, before the OS runs, PM setting options may be provided for a user by using a startup setting interface. The startup setting interface may be a UEFI setup interface or a BIOS interface. The electronic device is powered on. When the boot firmware is started, a display screen of the electronic device may display a startup setting interface. The user may select IMU PM from PM setting options in the startup setting interface. Therefore, data of a configuration item that is PM setting in startup configuration items of the boot firmware is data used to indicate the IMU firmware to perform PM. When reading the data of the configuration item that is the PM setting in the startup configuration items, the boot firmware sends the IMU PM execution instruction to the IMU firmware. The IMU PM execution instruction is directly sent, so that the IMU firmware can be notified, in a timelier manner, to perform IMU PM.

In a possible implementation, the IMU PM execution notification is first preset data in a preset storage address, and the obtaining an IMU PM execution notification includes:

obtaining the first preset data by polling the preset storage address.

In the solution shown in this embodiment of this disclosure, the boot firmware writes the first preset data into the preset storage address. Correspondingly, the processing in which the IMU firmware obtains the IMU PM execution notification is as follows: The IMU firmware obtains the first preset data by polling the preset storage address. The preset storage address is a storage address that is preset by a person skilled in the art and that is used to store a PM execution notification, and the first preset data may be a binary numeral "1".

In a possible implementation, the boot firmware is configured to prevent, by using the following method before the OS runs, the OS from performing operating system power management OS PM:

creating a first advanced configuration and power interface ACPI table, and reporting the first ACPI table to the OS, where the first ACPI table does not include a performance status table, to prevent the OS from performing OS PM, and the performance status table is a performance support status PSS table or a continuous performance control CPC table.

In the solution shown in this embodiment of this disclosure, according to different ACPI specifications, the ACPI table may include one of the PSS table and the CPC table. Both the PSS table and the CPC table can provide, for the OS, frequency adjustable values supported by the CPU. A difference is as follows: The PSS table provides frequency adjustable values that are of a plurality of different levels and that are supported by the CPU. For example, a frequency adjustable value of a P0 level is 2001 MHz, and a frequency adjustable value of a P2 level is 1900 MHz. The CPC table provides an upper limit and a lower limit of a frequency adjustable value supported by the CPU. The OS can adjust a frequency of the CPU based on the frequency adjustable values that are supported by the CPU and that are provided in the two tables. Therefore, when initializing an ACPI table, the boot firmware may not initialize a performance status table in the ACPI table, and therefore the OS cannot perform frequency adjustment on the CPU. In this solution, the OS can be more directly prevented from performing OS PM, and processing efficiency is higher.

In a possible implementation, the boot firmware is configured to prevent, by using the following method before the OS runs, the OS from performing operating system power management OS PM:

creating a second ACPI table, and reporting the second ACPI table to the OS, where the second ACPI table includes a performance status table, and frequency adjustable values in the performance status table included in the second ACPI table are a same preset value, or a header of the performance status table included in the second ACPI table is a value with an undefined range, to prevent the OS from performing OS PM.

In the solution shown in this embodiment of this disclosure, the boot firmware may initialize the frequency adjustable values in the performance status table to the same preset value. For different performance status tables, the following cases may exist: When the performance status table is a PSS table, frequency adjustable values of all levels in the performance status table may be all initialized to a same preset value. For example, the frequency adjustable values of all the levels are all initialized to a frequency adjustable value of a P0 level, or the frequency adjustable values of all the levels may be all initialized to any same preset value, for example, 0 MHz. When the performance status table is a CPC table, an upper limit and a lower limit of a frequency adjustable value of the CPU may be initialized to a same preset value. For example, the upper limit of the frequency adjustable value may be initialized to the lower limit of the frequency adjustable value, the lower limit of the frequency adjustable value may be initialized to the upper limit of the frequency adjustable value, or the lower limit and the upper limit of the frequency adjustable value may be adjusted to any same preset value, for example, 0 MHz. Alternatively, the header of the performance status table may be initialized to the value with an undefined range, so that the OS cannot find a frequency adjustable value by using the header. In this solution, the OS can be prevented from performing OS PM, without a need to modify a structure of an ACPI table.

In a possible implementation, the method further includes: after the boot firmware determines, before the OS runs, that PM is to be performed by the OS, the boot firmware performs the following operations:

creating a third ACPI table, and sending the third ACPI table to the OS, where the third ACPI table includes a performance status table, and a frequency adjustable value in the performance status table included in the third ACPI table is a preset frequency adjustable value supported by the CPU, so that the OS performs OS PM; and sending an IMU PM disable instruction to the IMU firmware; and the IMU firmware further performs the following operations:

receiving the IMU PM disable instruction sent by the boot firmware, and disabling IMU PM.

In the solution shown in this embodiment of this disclosure, the user may alternatively select OS PM from the PM setting options in the startup setting interface. Therefore, the data of the configuration item that is the PM setting in the startup configuration items of the boot firmware is data used to indicate the IMU firmware to disable PM, or may be understood as data used to indicate the OS to perform PM. When reading the data of the configuration item that is the PM setting in the startup configuration items, the boot firmware sends the IMU PM disable instruction to the IMU firmware. After receiving the IMU PM disable instruction, the IMU firmware disables the IMU PM. In addition, when initializing an ACPI table, the boot firmware may normally initialize a performance status table in the ACPI table, that is, initialize a frequency adjustable value in the performance status table in the ACPI table to a preset frequency adjustable value supported by the CPU, so that the OS can determine a frequency adjustable value of the CPU by loading the ACPI table, and then perform OS PM.

In a possible implementation, the method further includes: after the boot firmware determines, before the OS runs, that PM is to be performed by the OS, the boot firmware performs the following operations:

creating a third ACPI table, and sending the third ACPI table to the OS; and writing second preset data into the preset storage address; and the IMU firmware further performs the following operations:

obtaining the second preset data by polling the preset storage address, and disabling IMU PM.

In the solution shown in this embodiment of this disclosure, processing in which the boot firmware sends an IMU PM disable notification may be as follows: The boot firmware writes the second preset data into the preset storage address. Correspondingly, processing in which the IMU firmware obtains the IMU PM disable notification is as follows: The IMU firmware obtains the second preset data by polling the preset storage address. The preset storage address is a storage address that is preset by a person skilled in the art and that is used to store a PM execution notification, and the second preset data may be a binary numeral "0". In addition, when initializing an ACPI table, the boot firmware may normally initialize a performance status table in the ACPI table, that is, initialize a frequency adjustable value in the performance status table in the ACPI table to a preset frequency adjustable value supported by the CPU, so that the OS can determine a frequency adjustable value of the CPU by loading the ACPI table, and then perform OS PM.

In a possible implementation, the boot firmware is basic input/output system BIOS firmware or unified extensible firmware interface UEFI firmware.

In the solution shown in this embodiment of this disclosure, the boot firmware may be the BIOS firmware or the UEFI firmware, and different electronic devices may have different boot firmware.

In a possible implementation, the performance parameter includes the power consumption of the CPU, and before the obtaining a current performance parameter of the CPU, the IMU firmware performs the following operations:

receiving a power consumption limiting instruction sent by an out-of-band management system, where the power consumption limiting instruction carries a power consumption threshold; and the performing power management on the CPU based on the performance parameter includes:

if the power consumption of the CPU in the performance parameter is greater than the power consumption threshold, reducing a frequency and voltage of the CPU; or if the power consumption of the CPU is less than a preset multiple of the power consumption threshold, increasing a frequency and voltage of the CPU, where the preset multiple is greater than 0 and less than 1.

In the solution shown in this embodiment of this disclosure, the user may determine whether the frequency and voltage of the CPU need to be adjusted based on the power consumption of the CPU. The user may enter code for limiting the power consumption of the CPU into the out-of-band management system, and therefore the out-of-band management system may send the power consumption limiting instruction to the IMU firmware. The power consumption limiting instruction may carry the power consumption threshold. After receiving the power consumption limiting instruction, the IMU firmware obtains current power consumption of the CPU in real time. If the obtained current power consumption of the CPU is greater than the power consumption threshold sent by the out-of-band management system, the frequency and voltage of the CPU are reduced. In addition, power and a voltage of an IO interface of the CPU may be further reduced. If the frequency of the CPU has been adjusted to a lowest adjustable value, some unused ports of cores of the CPU may be disabled. If the power consumption of the CPU is less than the preset multiple of the power consumption threshold, the frequency and voltage of the CPU are increased. The preset multiple is greater than 0 and less than 1, such as 0.95. In addition, power and a voltage of the IO interface of the CPU may be further increased. In this solution, it may be determined, based on a user requirement, whether the frequency and the voltage need to be adjusted based on the power consumption. In this way, different requirements of different users can be met.

In a possible implementation, the performance parameter includes the temperature of the CPU, and the performing power management on the CPU based on the performance parameter includes:

if the temperature of the CPU is greater than a first temperature threshold, sending a high temperature alarm message to an out-of-band management system, where the high temperature alarm message is used to indicate the out-of-band management system to perform power-off protection on the CPU;

if the temperature of the CPU is less than the first temperature threshold and is greater than a second temperature threshold, reducing a frequency and voltage of the CPU; or if the temperature of the CPU is less than a third temperature threshold, increasing a frequency and voltage of the CPU, where the third temperature threshold is less than the second temperature threshold.

In the solution shown in this embodiment of this disclosure, a temperature sensor may be installed in the CPU, the temperature sensor monitors the temperature of the CPU in real time, and the IMU firmware may periodically obtain a current temperature of the CPU from the temperature sensor. For example, a period may be 0.5 second. Alternatively, the temperature sensor may periodically monitor the temperature of the CPU, and only after the temperature reaches a temperature control threshold, the temperature sensor may send a current temperature of the CPU to the IMU firmware. If the obtained current temperature of the CPU is greater than the first temperature threshold, the high temperature alarm message is sent to the out-of-band management system. After receiving the high temperature alarm message, the out-of-band management system performs power-off protection on the CPU to prevent the CPU from being damaged due to an excessively high temperature. If the temperature of the CPU is less than the first temperature threshold and is greater than the second temperature threshold, the frequency and voltage of the CPU are reduced. In addition, power and a voltage of an IO interface of the CPU may be further reduced, and a fan speed may be further increased to improve heat dissipation. If the temperature still cannot be effectively reduced, power domain statuses of cores in the CPU may be further adjusted, that is, power domains of some cores in an idle state are adjusted to be in a disabled state, in other words, these cores are disabled, so that the cores no longer run to generate heat. If the temperature of the CPU is less than the third temperature threshold, the frequency and voltage of the CPU may be increased. The third temperature threshold is less than the second temperature threshold. In addition, if power domains of some cores in the CPU are previously adjusted to be in the disabled state for cooling, in this case, the power domains of these cores may be adjusted to be in an enabled state, in other words, these cores are re-enabled.

In a possible implementation, the performance parameter includes the usage of the CPU, and the performing power management on the CPU based on the performance parameter includes:

if the usage of the CPU is greater than a first usage threshold, increasing a frequency and voltage of the CPU; or if the usage of the CPU is less than a second usage threshold, reducing a frequency and voltage of the CPU.

In the solution shown in this embodiment of this disclosure, a performance monitor unit (PMU) may be installed in each core of the CPU, and the PMU is configured to count a quantity of clocks in which the core in which the PMU is located is in a non-idle state. For each statistics period, the PMU counts, in the statistics period, clocks in which the core in which the PMU is located is in the non-idle state, and sends a quantity of clocks to the IMU firmware. The IMU firmware may divide the quantity of clocks in the non-idle state by a total quantity of clocks in the statistics period, to obtain usage of the corresponding core in the statistics period. For a clock domain, average usage of cores in the clock domain is obtained by dividing a sum of usage of all the cores in the clock domain by a quantity of cores in the clock domain. For one CPU, only one clock domain may be set, that is, all cores are located in the same clock domain. In this case, usage of the CPU is average usage of the cores in the clock domain. Certainly, for one CPU, a plurality of clock domains may be alternatively disposed. For example, each core corresponds to one clock domain, or each several cores correspond to one clock domain. In this case, usage of the CPU may be jointly represented by average usage of cores in these clock domains. After average usage of cores in each clock domain is obtained, if the average usage is greater than the first usage threshold, frequencies and voltages of the cores in the clock domain may be increased. If the average usage is less than the second usage threshold, frequencies and voltages of the cores in the clock domain are reduced. The first usage threshold is less than the second usage threshold.

In a possible implementation, the performing power management on the CPU based on the performance parameter includes:

entering the performance parameter and a current frequency and voltage of the CPU into a pre-trained feature extraction model, to obtain to-be-classified feature data;

entering the to-be-classified feature data into a pre-trained classifier model, to obtain a target service type;

determining, based on a pre-stored correspondence between a service type and a configuration adjustment policy, a configuration adjustment policy corresponding to the target service type, where the configuration adjustment policy includes at least a to-be-used frequency and a to-be-used voltage of the CPU; and respectively adjusting the frequency and voltage of the CPU to the to-be-used frequency and the to-be-used voltage.

In the solution shown in this embodiment of this disclosure, in order that how to adjust the frequency and voltage of the CPU can be comprehensively determined based on all performance parameters of the CPU, the IMU firmware may enter periodically obtained performance parameters of the CPU and the voltage and frequency of the CPU into the pre-trained feature extraction model and classifier model to obtain the corresponding target service type; then, query the correspondence between a service type and a configuration adjustment policy to obtain the configuration adjustment policy corresponding to the target service type, where the configuration adjustment policy includes the to-be-used frequency and the to-be-used voltage of the CPU; and then, may adjust the frequency of the CPU to the to-be-used frequency, and adjust the voltage of the CPU to the to-be-used voltage. In this solution, the frequency and voltage of the CPU are more flexibly adjusted.

According to a second aspect, a power management method is provided. The method is used for power management of an electronic device. The electronic device includes a central processing unit CPU and a storage, the storage stores a plurality of program instructions respectively corresponding to boot firmware, an operating system OS, and intelligent management unit IMU firmware, the plurality of program instructions are read and executed by the CPU to implement functions of the firmware, the OS, and the IMU firmware, and the power management method is performed by the IMU firmware and includes:

in a running process of the OS, receiving a first notification message that is sent by an out-of-band management system and that is used to notify the IMU firmware to perform IMU PM;

interacting with the OS based on the first notification message, so that the OS is no longer responsible for the power management;

obtaining a current performance parameter of the CPU, where the performance parameter includes one or more of power consumption, a temperature, and usage of the CPU; and performing power management on the CPU based on the performance parameter.

In the solution shown in this embodiment of this disclosure, if in the running process of the OS of a server, PM is performed by the OS, a user may enable the IMU PM by using the out-of-band management system of the server, so that the IMU firmware is responsible for the PM. The out-of-band management system may be a baseboard management controller (BMC). The user may enter code for enabling the IMU PM into the out-of-band management system, and therefore the out-of-band management system sends the first notification message to the IMU firmware by using an intelligent platform management interface (IPMI), so that the IMU firmware performs IMU PM after receiving the first notification message. The IMU firmware may interact with the OS, so that the OS is no longer responsible for the power management. After the IMU PM is enabled, the IMU firmware may periodically obtain a real-time performance parameter of the CPU, such as power consumption, a temperature, and usage, and then adjust a frequency and voltage of the CPU based on the obtained performance parameter, to implement power management. In this solution, in the running process of the OS, OS PM may be switched to the IMU PM, so that the power management of the electronic device is more flexible. In addition, in this solution, the performance parameter obtaining and the CPU frequency and voltage adjustment are both directly implemented by the IMU firmware, without a need to interact with the OS, thereby reducing a CPU adjustment latency.

In a possible implementation, the interacting with the OS based on the first notification message, so that the OS is no longer responsible for the power management includes:

if receiving a first power management request sent by the OS, returning a preset message to the OS instead of performing power management according to the first power management request, so that the OS is no longer responsible for the power management.

In the solution shown in this embodiment of this disclosure, the first power management request may be a request for indicating, by the OS, the IMU firmware to perform frequency adjustment on the CPU. In this solution, after receiving the first power management request, the IMU firmware does not perform the frequency adjustment operation corresponding to the first power management request, but performs IMU PM of the IMU firmware. In addition, although the IMU firmware does not perform frequency adjustment according to the first power management request, after receiving the first power management request, the IMU firmware may return the preset message to the OS. The preset message may be an execution success notification message, to deceive the OS, so that the OS considers that the OS is responsible for the PM, but actually the IMU firmware is responsible for the PM. In this solution, an ACPI table does not need to be modified, so that the OS PM can be more efficiently switched to the IMU PM.

In a possible implementation, the interacting with the OS based on the first notification message includes:

after receiving the first notification message, obtaining a fourth advanced configuration and power interface ACPI table, and updating the fourth ACPI table to obtain a fourth updated ACPI table; and sending a fourth ACPI table update message to the OS, where the fourth ACPI table update message is used to indicate the OS to obtain the fourth updated ACPI table, so that the OS disables the OS PM based on the fourth updated ACPI table.

In the solution shown in this embodiment of this disclosure, in order that the OS no longer performs OS PM, an ACPI table may be obtained from a memory, the ACPI table may be updated, and an updated ACPI table may be stored in an original storage address; and then an ACPI table update message may be sent to the OS, to indicate the OS to obtain the ACPI table from the memory and parse the ACPI table, so that the OS cannot perform power management based on the ACPI table.

In a possible implementation, the updating the fourth ACPI table includes:

removing a performance status table included in the fourth ACPI table, where the performance status table is a PSS table or a CPC table;

adjusting, to a same preset value, frequency adjustable values in a performance status table included in the fourth ACPI table; or modifying, into a value with an undefined range, a header of a performance status table included in the fourth ACPI table.

In the solution shown in this embodiment of this disclosure, the IMU firmware may obtain the ACPI table (the fourth ACPI table) from the memory, remove a performance status table from the ACPI table, and then store an ACPI table obtained after the removal in the original storage address. In this way, after obtaining the ACPI table, the OS cannot obtain the performance status table through parsing, and therefore cannot perform OS PM.

Alternatively, the IMU firmware adjusts frequency adjustable values in a performance status table in the ACPI table to a same preset value. For different performance status tables, the following cases may exist. When the performance status table is a PSS table, frequency adjustable values of all levels in the performance status table may be all adjusted to a same preset value. For example, the frequency adjustable values of all the levels are all adjusted to a frequency adjustable value of a P0 level, or the frequency adjustable values of all the levels may be all adjusted to any same preset value, for example, 0 MHz. When the performance status table is a CPC table, an upper limit and a lower limit of a frequency adjustable value of the CPU may be adjusted to a same preset value. For example, the upper limit of the frequency adjustable value may be adjusted to the lower limit of the frequency adjustable value, the lower limit of the frequency adjustable value may be adjusted to the upper limit of the frequency adjustable value, or the lower limit and the upper limit of the frequency adjustable value may be adjusted to any same preset value, for example, 0 MHz.

Alternatively, the IMU firmware may modify, into a value with an undefined range, a header of a performance status table in the ACPI table, so that the OS cannot find a frequency adjustable value by using the header.

In a possible implementation, the IMU firmware further performs the following operations:

in the running process of the operating system OS, receiving a second notification message that is sent by the out-of-band management system and that is used to notify the IMU firmware to enable OS PM; and if the OS is currently responsible for the power management, skipping processing the second notification message; or if the OS is currently not responsible for the power management, interacting with the OS based on the second notification message, so that the OS is responsible for the power management.

In the solution shown in this embodiment of this disclosure, the user may enter code for enabling the OS PM into the out-of-band management system, and therefore the out-of-band management system may send the second notification message to the IMU firmware by using the IPMI. If current PM is the OS PM, the second notification message may not be processed. If current PM is the IMU PM, after the second notification message is received, the IMU PM needs to be disabled, and the OS is caused to be responsible for the PM, in other words, the OS PM is enabled.

In a possible implementation, the interacting with the OS based on the second notification message, so that the OS is responsible for the power management includes:

after receiving a second power management request sent by the OS, performing the second power management request.

In a possible implementation, the interacting with the OS based on the second notification message, so that the OS is responsible for the power management includes:

obtaining a fifth ACPI table, and updating the fifth ACPI table to obtain a fifth updated ACPI table; and sending a fifth ACPI table update message to the OS, where the fifth ACPI table update message is used to indicate the OS to obtain the fifth updated ACPI table, so that the OS enables the operating system power management OS PM based on the fifth updated ACPI table.

In the solution shown in this embodiment of this disclosure, the IMU firmware may update an ACPI table to cause the OS to enable the OS PM.

In a possible implementation, the updating the fifth ACPI table includes:

if the fifth ACPI table does not include a performance status table, adding a performance status table to the fifth ACPI table; or if the fifth ACPI table includes a performance status table, adjusting, to a preset frequency adjustable value supported by the CPU, a frequency adjustable value in the performance status table included in the fifth ACPI table.

In the solution shown in this embodiment of this disclosure, in order that the OS enables the OS PM, the IMU firmware updates an ACPI table by using the following operation. If previous ACPI table updating performed when the OS is caused to be not responsible for the PM is removing a performance status table from an ACPI table, herein, the ACPI table (the fifth ACPI table) may be obtained from the memory, and a normal performance status table may be added to the ACPI table. If previous ACPI table updating performed when the OS is caused to be not responsible for the PM is modifying a frequency adjustable value in an ACPI table without removing a performance status table, herein, a frequency adjustable value in the performance status table may be adjusted to a preset frequency adjustable value supported by the CPU. If previous ACPI table updating performed when the OS is caused to be not responsible for the PM is modifying a header without removing a performance status table, herein, a header of the performance status table may be adjusted to a header of a normal frequency adjustable value. After the ACPI table is updated, an updated ACPI table is stored in an original storage address.

In a possible implementation, the performance parameter includes the power consumption of the CPU, and before the obtaining a current performance parameter of the CPU, a program instruction corresponding to the IMU firmware is further read by the CPU and the CPU performs the following operations:
  receiving a power consumption limiting instruction sent by the out-of-band management system, where the power consumption limiting instruction carries a power consumption threshold; and
  the performing power management on the CPU based on the performance parameter includes:
  if the power consumption of the CPU in the performance parameter is greater than the power consumption threshold, reducing a frequency and voltage of the CPU; or
  if the power consumption of the CPU is less than a preset multiple of the power consumption threshold, increasing a frequency and voltage of the CPU, where the preset multiple is greater than 0 and less than 1.

In the solution shown in this embodiment of this disclosure, the user may determine whether the frequency and voltage of the CPU need to be adjusted based on the power consumption of the CPU. The user may enter code for limiting the power consumption of the CPU into the out-of-band management system, and therefore the out-of-band management system may send the power consumption limiting instruction to the IMU firmware based on the code. The power consumption limiting instruction may carry the power consumption threshold. After receiving the power consumption limiting instruction, the IMU firmware obtains current power consumption of the CPU in real time. If the obtained current power consumption of the CPU is greater than the power consumption threshold sent by the out-of-band management system, the frequency and voltage of the CPU are reduced. In addition, power and a voltage of an IO interface of the CPU may be further reduced. If the frequency of the CPU has been adjusted to a lowest adjustable value, some unused ports of cores of the CPU may be disabled. If the power consumption of the CPU is less than the preset multiple of the power consumption threshold, the frequency and voltage of the CPU are increased. The preset multiple is greater than 0 and less than 1, such as 0.95. In addition, power and a voltage of the IO interface of the CPU may be further increased. In this solution, it may be determined, based on a user requirement, whether the frequency and the voltage need to be adjusted based on the power consumption. In this way, different requirements of different users can be met.

In a possible implementation, the performance parameter includes the temperature of the CPU, and the performing power management on the CPU based on the performance parameter includes:
  if the temperature of the CPU is greater than a first temperature threshold, sending a high temperature alarm message to the out-of-band management system, where the high temperature alarm message is used to indicate the out-of-band management system to perform power-off protection on the CPU;
  if the temperature of the CPU is less than the first temperature threshold and is greater than a second temperature threshold, reducing a frequency and voltage of the CPU; or
  if the temperature of the CPU is less than a third temperature threshold, increasing a frequency and voltage of the CPU, where the third temperature threshold is less than the second temperature threshold.

In the solution shown in this embodiment of this disclosure, a temperature sensor may be installed in the CPU, the temperature sensor monitors the temperature of the CPU in real time, and the IMU firmware may periodically obtain a current temperature of the CPU from the temperature sensor. For example, a period may be 0.5 second. Alternatively, the temperature sensor may periodically monitor the temperature of the CPU, and only after the temperature reaches a temperature control threshold, the temperature sensor may send a current temperature of the CPU to the IMU firmware. If the obtained current temperature of the CPU is greater than the first temperature threshold, the high temperature alarm message is sent to the out-of-band management system. After receiving the high temperature alarm message, the out-of-band management system performs power-off protection on the CPU to prevent the CPU from being damaged due to an excessively high temperature. If the temperature of the CPU is less than the first temperature threshold and is greater than the second temperature threshold, the frequency and voltage of the CPU are reduced. In addition, power and a voltage of an IO interface of the CPU may be further reduced, and a fan speed may be further increased to improve heat dissipation. If the temperature still cannot be effectively reduced, power domain statuses of cores in the CPU may be further adjusted, that is, power domains of some cores in an idle state are adjusted to be in a disabled state, in other words, these cores are disabled, so that the cores no longer run to generate heat. If the temperature of the CPU is less than the third temperature threshold, the frequency and voltage of the CPU may be increased. The third temperature threshold is less than the second temperature threshold. In addition, if power domains of some cores in the CPU are previously adjusted to be in the disabled state for cooling, in this case, the power domains of these cores may be adjusted to be in an enabled state, in other words, these cores are re-enabled.

In a possible implementation, the performance parameter includes the usage of the CPU, and the performing power management on the CPU based on the performance parameter includes:
  if the usage of the CPU is greater than a first usage threshold, increasing a frequency and voltage of the CPU; or
  if the usage of the CPU is less than a second usage threshold, reducing a frequency and voltage of the CPU.

In the solution shown in this embodiment of this disclosure, a performance monitor unit (PMU) may be installed in each core of the CPU, and the PMU is configured to count a quantity of clocks in which the core in which the PMU is located is in a non-idle state. For each statistics period, the PMU counts, in the statistics period, clocks in which the core in which the PMU is located is in the non-idle state, and sends a quantity of clocks to the IMU firmware. The IMU firmware may divide the quantity of clocks in the non-idle state by a total quantity of clocks in the statistics period, to obtain usage of the corresponding core in the statistics period. For a clock domain, average usage of cores in the clock domain is obtained by dividing a sum of usage of all the cores in the clock domain by a quantity of cores in the clock domain. For one CPU, only one clock domain may be set, that is, all cores are located in the same clock domain. In this case, usage of the CPU is average usage of the cores in the clock domain. Certainly, for one CPU, a plurality of clock domains may be alternatively disposed. For example, each core corresponds to one clock domain, or each several cores correspond to one clock domain. In this case, usage of the CPU may be jointly represented by average usage of cores in these clock domains. After average usage of cores in each clock domain is obtained, if the average usage is greater than the first usage threshold, frequencies and voltages of the cores in the clock domain may be increased. If the average usage is less than the second usage threshold, frequencies and voltages of the cores in the clock domain are reduced. The first usage threshold is less than the second usage threshold.

In a possible implementation, the performing power management on the CPU based on the performance parameter includes:

entering the performance parameter and a current frequency and voltage of the CPU into a pre-trained feature extraction model, to obtain to-be-classified feature data;

entering the to-be-classified feature data into a pre-trained classifier model, to obtain a target service type;

determining, based on a pre-stored correspondence between a service type and a configuration adjustment policy, a configuration adjustment policy corresponding to the target service type, where the configuration adjustment policy includes at least a to-be-used frequency and a to-be-used voltage of the CPU; and respectively adjusting the frequency and voltage of the CPU to the to-be-used frequency and the to-be-used voltage.

In the solution shown in this embodiment of this disclosure, in order that how to adjust the frequency and voltage of the CPU can be comprehensively determined based on all performance parameters of the CPU, the IMU firmware may enter periodically obtained performance parameters of the CPU and the voltage and frequency of the CPU into the pre-trained feature extraction model and classifier model to obtain the corresponding target service type; then, query the correspondence between a service type and a configuration adjustment policy to obtain the configuration adjustment policy corresponding to the target service type, where the configuration adjustment policy includes the to-be-used frequency and the to-be-used voltage of the CPU; and then, may adjust the frequency of the CPU to the to-be-used frequency, and adjust the voltage of the CPU to the to-be-used voltage. In this solution, the frequency and voltage of the CPU are more flexibly adjusted.

According to a third aspect, a power management device is provided. The device includes a CPU and a storage, the storage stores a plurality of program instructions respectively corresponding to boot firmware, an operating system OS, and intelligent management unit IMU firmware, and the plurality of program instructions are read and executed by the CPU to implement functions of the boot firmware, the OS, and the IMU firmware; and the IMU firmware is configured to perform the power management method according to any one of the first aspect, the second aspect, or the possible implementations of the first aspect and the second aspect.

In a possible implementation, the CPU includes an IMU core and a service processor AP core, and the AP core is isolated from the IMU core by using a system isolation wall SIW; and a function of the IMU firmware is processed by the IMU core.

Beneficial effects of the technical solutions provided in embodiments of this disclosure are as follows:

The IMU firmware may obtain an IMU PM execution notification to enable IMU PM; and directly obtain the current performance parameter of the CPU, and adjust the frequency and voltage of the CPU based on the obtained performance parameter, to implement power management. In this process, the OS does not need to obtain the performance parameter and then notify the IMU firmware to adjust the frequency and voltage of the CPU. Therefore, interaction procedures are reduced, so that the frequency and the voltage are more efficiently adjusted.

DESCRIPTION OF EMBODIMENTS

Embodiments of this disclosure provide a power management method. The method may be used for power management of an electronic device. The electronic device may include a CPU and a storage. The storage may store a plurality of program instructions respectively corresponding to firmware and an OS. The plurality of program instructions are read and executed by the CPU to implement functions of the firmware and the OS. The firmware may include boot firmware and IMU firmware. The power management method provided in embodiments of this disclosure may be performed by the IMU firmware.

Figure 1:
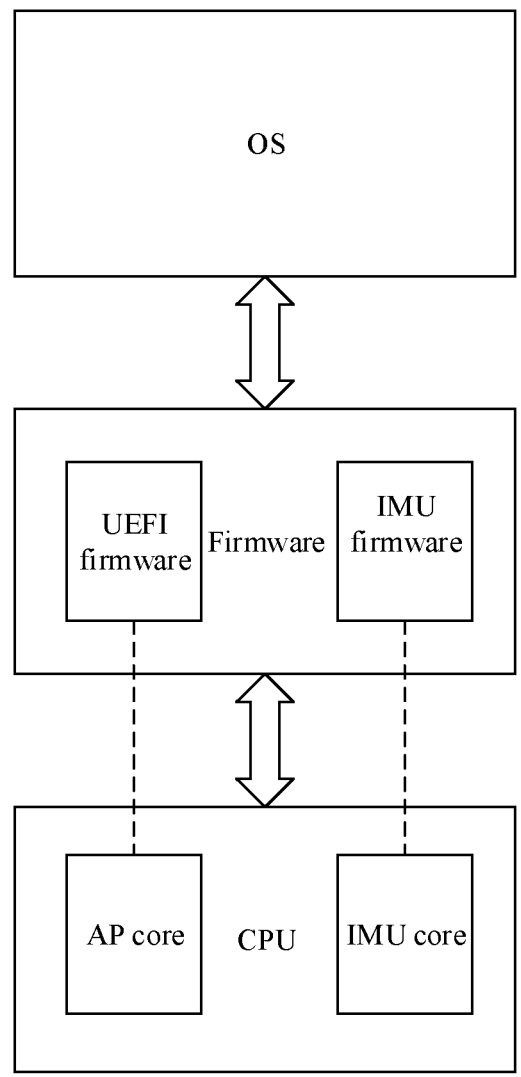
FIG. 1 is a schematic diagram of a structure of a server according to an embodiment of this disclosure.

The electronic device may be a server, a computer, or the like. In embodiments of this disclosure, an example in which the electronic device is a server is used for description. As shown in FIG. 1, a structure of a server may include an OS, firmware, and a CPU. The firmware may include boot firmware and IMU firmware. The boot firmware is, for example, unified extensible firmware interface (unified extensible firmware interface, UEFI) firmware or basic input/output system (BIOS) firmware, and is shown as the UEFI firmware in the figure. The UEFI firmware may be configured to: when the OS is started, establish an advanced configuration and power interface (ACPI) table, so that the OS can be normally started. The IMU firmware may be configured to implement the power management method provided in this disclosure, that is, obtain a performance parameter of the CPU, and adjust a frequency and voltage of the CPU, to implement power management of the server. The CPU may include a plurality of independent cores, such as an application processor (AP) core for service processing, and a processor core configured to implement the power management method provided in embodiments of this disclosure. The processor core is referred to as an IMU core in embodiments of this disclosure. The UEFI firmware and the OS may run on the AP core, and the IMU firmware may run on the IMU core. Certainly, the CPU may include only the AP core. Correspondingly, the IMU firmware may run on the AP core, and the power management method provided in embodiments of this disclosure may also be implemented.

Figure 2:
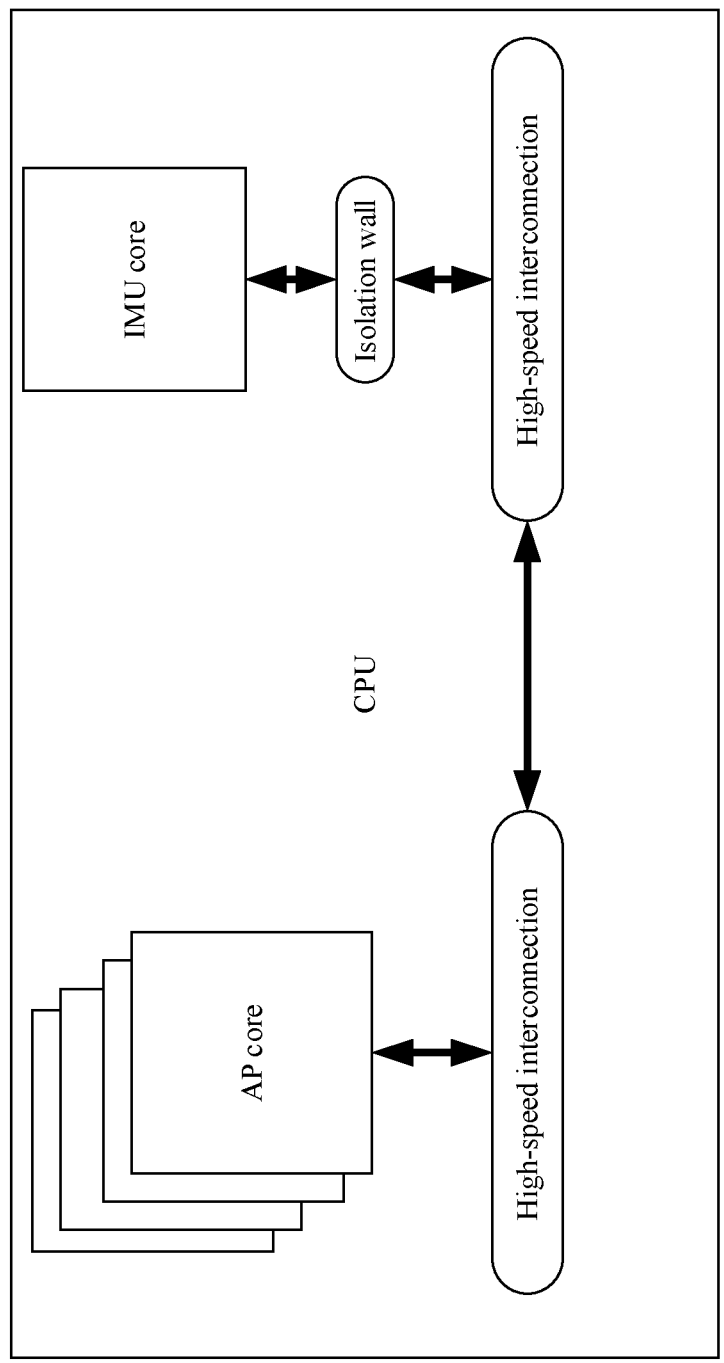
FIG. 2 is a schematic diagram of a structure of a CPU according to an embodiment of this disclosure.

For a schematic diagram of a structure of a CPU that includes an AP core and an IMU core, refer to FIG. 2. As shown in FIG. 2, a plurality of AP cores are on a left side, an IMU core is on a right side, and high-speed interconnection may be performed between the AP core and the IMU core. In addition, because the IMU core independent of the CPU is configured to run IMU firmware to implement power management, data in the IMU core is relatively important. To ensure security of the data in the IMU core, the AP core may be isolated from the IMU core by using a system isolation wall (SIW), to implement unidirectional access between the AP core and the IMU core, that is, the IMU core can access data in the AP core, but the AP core cannot access the data in the IMU core. It should be noted that a name of the IMU firmware is not limited to IMU. In another embodiment, the IMU firmware may alternatively have another name.

The following describes a processing procedure of a power management method provided in an embodiment of this disclosure.

Figure 3:
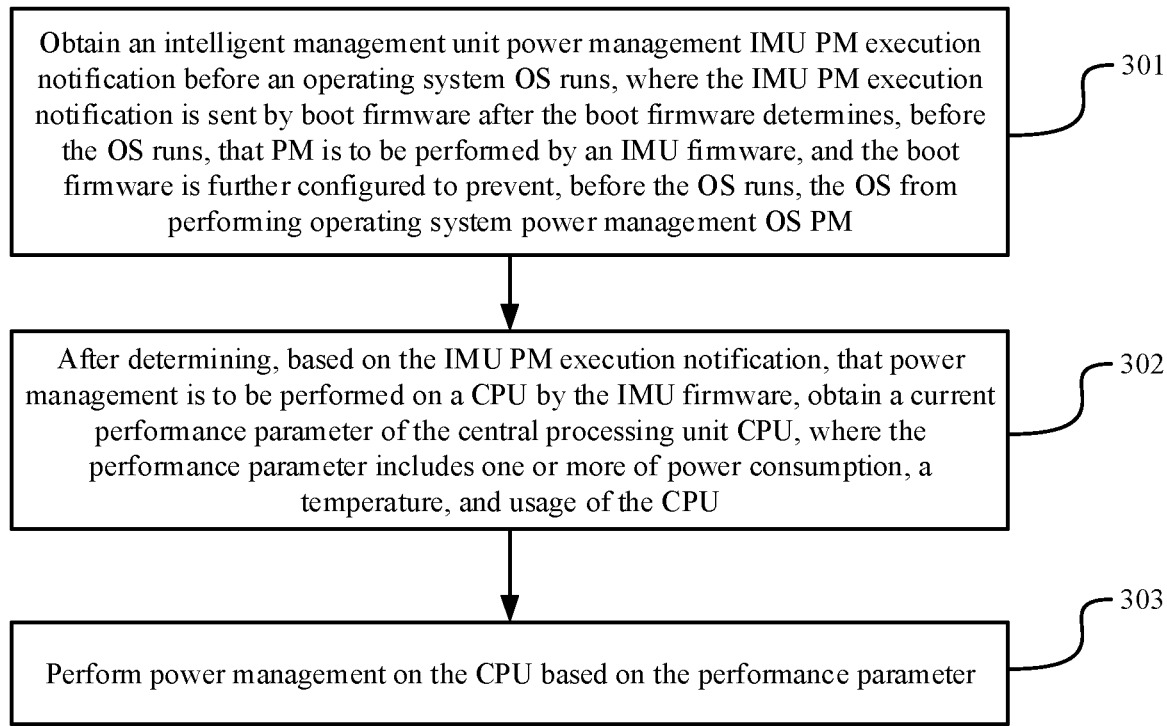
FIG. 3 is a schematic flowchart of a power management method according to an embodiment of this disclosure.

As shown in FIG. 3, a processing procedure of the method may include the following steps.

Step 301: Obtain an intelligent management unit power management (IMU PM) execution notification before an operating system OS runs, where the IMU PM execution notification is sent by boot firmware after the boot firmware determines, before the OS runs, that PM is to be performed by an IMU firmware, and the boot firmware is further configured to prevent, before the OS runs, the OS from performing operating system power management (OS PM).

The IMU PM execution notification is used to notify the IMU firmware to perform IMU PM.

During implementation, before the OS runs, if determining that power management (PM) is to be performed by the IMU firmware, the boot firmware may send the IMU PM execution notification The IMU firmware may obtain the IMU PM execution notification to enable the IMU PM. To avoid a conflict with OS PM performed by the OS, before sending the IMU PM execution notification, the boot firmware may first prevent the OS from performing OS PM.

Before the OS runs, the boot firmware may determine, in the following manner, that PM is to be performed by the IMU firmware.

Before the OS runs, PM setting options may be provided for a user by using a startup setting interface. The startup setting interface may be a UEFI setup interface or a BIOS interface. A server is powered on. When the boot firmware is started, a display screen outside the server may display a startup setting interface. The user may select IMU PM from PM setting options in the startup setting interface. Therefore, data of a configuration item that is PM setting in startup configuration items of the boot firmware is data used to indicate the IMU firmware to perform PM. When reading the data of the configuration item that is the PM setting in the startup configuration items, the boot firmware sends the IMU PM execution notification.

The IMU PM execution notification may be in a plurality of forms. The following lists several of the plurality of forms for description.

Form 1: The IMU PM execution notification is an IMU PM execution instruction.

Therefore, the processing in which the boot firmware sends the IMU PM execution notification may be as follows: The boot firmware sends the IMU PM execution instruction to the IMU firmware. Correspondingly, the processing in which the IMU firmware obtains the IMU PM execution notification is as follows: The IMU firmware receives the IMU PM execution instruction sent by the boot firmware.

Form 2: The IMU PM execution notification is first preset data in a preset storage address.

Therefore, the processing in which the boot firmware sends the IMU PM execution notification may be as follows: The boot firmware writes the first preset data into the preset storage address. Correspondingly, the processing in which the IMU firmware obtains the IMU PM execution notification is as follows: The IMU firmware obtains the first preset data by polling the preset storage address. The preset storage address is a storage address that is preset by a person skilled in the art and that is used to store a PM execution notification, and the first preset data may be a binary numeral "1".

In addition, the boot firmware may prevent, in a plurality of manners, the OS from performing OS PM. The following lists several of the plurality of manners for description.

Manner 1: The boot firmware creates a first advanced configuration and power interface ACPI table, and reports the first ACPI table to the OS, where the first ACPI table does not include a performance status table, to prevent the OS from performing OS PM, and the performance status table is a performance support status PSS table or a continuous performance control CPC table.

It should be noted herein that, according to different ACPI specifications, the ACPI table may include one of the PSS table and the CPC table. Both the PSS table and the CPC table can provide, for the OS, frequency adjustable values supported by a CPU. A difference is as follows: The PSS table provides frequency adjustable values that are of a plurality of different levels and that are supported by the CPU. For example, a frequency adjustable value of a P0 level is 2001 MHz, and a frequency adjustable value of a P2 level is 1900 MHz. The CPC table provides an upper limit and a lower limit of a frequency adjustable value supported by the CPU. The OS can adjust a frequency of the CPU based on the frequency adjustable values that are supported by the CPU and that are provided in the two tables.

During implementation, when initializing an ACPI table (namely, the first ACPI table), the boot firmware may not initialize a performance status table in the ACPI table, and therefore the OS cannot perform frequency adjustment on the CPU.

Manner 2: creating a second ACPI table, and reporting the second ACPI table to the OS, where the second ACPI table includes a performance status table, and frequency adjustable values in the performance status table included in the second ACPI table are a same preset value, or a header of the performance status table included in the second ACPI table is a value with an undefined range, to prevent the OS from performing OS PM.

During implementation, when initializing an ACPI table (namely, the second ACPI table), the boot firmware may initialize a performance status table in the ACPI table, that is, initialize frequency adjustable values in the performance status table to a same preset value. For different performance status tables, the following cases may exist: When the performance status table is a PSS table, frequency adjustable values of all levels in the performance status table may be all initialized to a same preset value. For example, the frequency adjustable values of all the levels are all initialized to a frequency adjustable value of a P0 level, or the frequency adjustable values of all the levels may be all initialized to any same preset value, for example, 0 MHz. When the performance status table is a CPC table, an upper limit and a lower limit of a frequency adjustable value of a CPU may be initialized to a same preset value. For example, the upper limit of the frequency adjustable value may be initialized to the lower limit of the frequency adjustable value, the lower limit of the frequency adjustable value may be initialized to the upper limit of the frequency adjustable value, or the lower limit and the upper limit of the frequency adjustable value may be adjusted to any same preset value, for example, 0 MHz. Alternatively, the header of the performance status table may be initialized to the value with an undefined range, so that the OS cannot find a frequency adjustable value by using the header.

In a possible implementation, before the OS runs, the OS may be alternatively selected to perform PM. Correspondingly, the boot firmware may perform the following operations: creating a third ACPI table, and sending the third ACPI table to the OS, where the third ACPI table includes a performance status table, and a frequency adjustable value in the performance status table included in the third ACPI table is a preset frequency adjustable value supported by the CPU, so that the OS performs OS PM; and sending an IMU PM disable notification. Correspondingly, the IMU firmware may further perform the following operations: obtaining the IMU PM disable notification, and disabling the IMU PM.

During implementation, the user may select OS PM from the PM setting options in the startup setting interface. Therefore, the data of the configuration item that is the PM setting in the startup configuration items of the boot firmware is data used to indicate the IMU firmware to disable PM, or may be understood as data used to indicate the OS to perform PM. When reading the data of the configuration item that is the PM setting in the startup configuration items, the boot firmware sends the IMU PM disable notification.

The IMU PM disable notification may be in a plurality of forms. The following lists several of the plurality of forms for description.

Form 1: The IMU PM disable notification is an IMU PM disable instruction.

The processing in which the boot firmware sends the IMU PM disable notification may be as follows: The boot firmware sends the IMU PM disable instruction to the IMU firmware. Correspondingly, the processing in which the IMU firmware obtains the IMU PM disable notification is as follows: The IMU firmware receives the IMU PM disable instruction sent by the boot firmware.

Form 2: The IMU PM disable notification is second preset data in the preset storage address.

The processing in which the boot firmware sends the IMU PM disable notification may be as follows: The boot firmware writes the second preset data into the preset storage address. Correspondingly, the processing in which the IMU firmware obtains the IMU PM disable notification is as follows: The IMU firmware obtains the second preset data by polling the preset storage address. The preset storage address is a storage address that is preset by a person skilled in the art and that is used to store a PM execution notification, and the second preset data may be a binary numeral "0".

When initializing an ACPI table (namely, the third ACPI table), the boot firmware may normally initialize a performance status table in the ACPI table, that is, initialize a frequency adjustable value in the performance status table in the ACPI table to a preset frequency adjustable value supported by the CPU, so that the OS can determine a frequency adjustable value of the CPU by loading the ACPI table, and then perform OS PM.

Step 302: After determining, based on the IMU PM execution notification, that power management is to be performed on the CPU by the IMU firmware, obtain a current performance parameter of the central processing unit CPU, where the performance parameter includes one or more of power consumption, a temperature, and usage of the CPU.

During implementation, the IMU firmware may obtain the performance parameter of the CPU, such as the power consumption, the temperature, and the usage.

For obtaining of the power consumption of the CPU:

After the IMU PM is enabled, the IMU firmware may periodically obtain the power consumption of the CPU. For example, a period may be 0.5 second. Alternatively, after the IMU PM is enabled, the IMU firmware may not immediately obtain the power consumption of the CPU, but the user determines whether frequency adjustment and voltage adjustment need to be performed on the CPU based on the power consumption of the CPU; and only when the user needs to perform frequency adjustment and voltage adjustment on the CPU based on the power consumption of the CPU, the IMU firmware periodically obtains the power consumption of the CPU. When the user needs to perform frequency adjustment and voltage adjustment on the CPU based on the power consumption of the CPU, the user may enter code for limiting the power consumption of the CPU into an out-of-band management system, and therefore the out-of-band management system may send a power consumption limiting instruction to the IMU firmware. The power consumption limiting instruction may carry a power consumption threshold. After receiving the power consumption limiting instruction, the IMU firmware obtains current power consumption of the CPU in real time.

For obtaining of the temperature of the CPU:

A temperature sensor may be installed in the CPU, the temperature sensor monitors the temperature of the CPU in real time, and the IMU firmware may periodically obtain a current temperature of the CPU from the temperature sensor. For example, a period may be 0.5 second. Alternatively, the temperature sensor may periodically monitor the temperature of the CPU, and only after the temperature reaches a temperature control threshold, the temperature sensor may send a current temperature of the CPU to the IMU firmware.

For obtaining of the usage of the CPU:

A performance monitor unit (PMU) may be installed in each core of the CPU, and the PMU is configured to count a quantity of clocks in which the core in which the PMU is located is in a non-idle state. For each statistics period, the PMU counts, in the statistics period, clocks in which the core in which the PMU is located is in the non-idle state, and sends a quantity of clocks to the IMU firmware. The IMU firmware may divide the quantity of clocks in the non-idle state by a total quantity of clocks in the statistics period, to obtain usage of the corresponding core in the statistics period. For a clock domain, average usage of cores in the clock domain is obtained by dividing a sum of usage of all the cores in the clock domain by a quantity of cores in the clock domain. For one CPU, only one clock domain may be set, that is, all cores are located in the same clock domain. In this case, usage of the CPU is average usage of the cores in the clock domain. Certainly, for one CPU, a plurality of clock domains may be alternatively disposed. For example, each core corresponds to one clock domain, or each several cores correspond to one clock domain. In this case, usage of the CPU may be jointly represented by average usage of cores in these clock domains.

Step 303: Perform power management on the CPU based on the performance parameter.

During implementation, the IMU firmware may adjust a frequency and voltage of the CPU based on different obtained performance parameters. The following describes adjusting the frequency and voltage of the CPU based on each obtained performance parameter.

For adjusting performed based on the power consumption of the CPU:

If the obtained current power consumption of the CPU is greater than the power consumption threshold sent by the out-of-band management system, the frequency of the CPU is reduced, or the voltage of the CPU may be further reduced while the frequency is reduced. In addition, power and a voltage of an IO interface of the CPU may be further reduced. If the frequency of the CPU has been adjusted to a lowest adjustable value, some unused ports of cores of the CPU may be disabled. If the power consumption of the CPU is less than a preset multiple of the power consumption threshold, the frequency and voltage of the CPU are increased. The preset multiple is greater than 0 and less than 1, such as 0.95. In addition, power and a voltage of the IO interface of the CPU may be further increased.

For adjusting performed based on the temperature of the CPU:

If the obtained current temperature of the CPU is greater than a first temperature threshold, a high temperature alarm message is sent to the out-of-band management system. After receiving the high temperature alarm message, the out-of-band management system performs power-off protection on the CPU to prevent the CPU from being damaged due to an excessively high temperature. If the temperature of the CPU is less than the first temperature threshold and is greater than a second temperature threshold, the frequency of the CPU is reduced, or the voltage of the CPU may be further reduced while the frequency is reduced. In addition, power and a voltage of an IO interface of the CPU may be further reduced, and a fan speed may be further increased to improve heat dissipation. If the temperature still cannot be effectively reduced, power domain statuses of cores in the CPU may be further adjusted, that is, power domains of some cores in an idle state are adjusted to be in a disabled state, in other words, these cores are disabled, so that the cores no longer run to generate heat. If the temperature of the CPU is less than a third temperature threshold, the frequency of the CPU may be increased, or the voltage of the CPU may be further increased while the frequency is increased. The third temperature threshold is less than the second temperature threshold. In addition, if power domains of some cores in the CPU are previously adjusted to be in the disabled state for cooling, in this case, the power domains of these cores may be adjusted to be in an enabled state, in other words, these cores are re-enabled.

For adjusting performed based on the usage of the CPU:

After average usage of cores in each clock domain is obtained, if the average usage is greater than a first usage threshold, frequencies of the cores in the clock domain may be increased, or voltages of the cores may be further increased while the frequencies are increased. If the average usage is less than a second usage threshold, frequencies of the cores in the clock domain may be reduced, or voltages of the cores may be further reduced while the frequencies are reduced. The first usage threshold is less than the second usage threshold.

It should be noted herein that the increasing or reducing the frequency of the CPU may be implemented by adjusting a phase-locked loop (PLL) of a clock domain corresponding to each core in the CPU. When the frequency of the CPU is adjusted by using the PLL, there may be the following several modes.

Mode 1: Fast-rise and slow-fall mode, that is, the frequency is fast increased and the frequency is slowly reduced. This mode can ensure performance of the CPU.

Mode 2: Slow-rise and fast-fall mode, that is, the frequency is slowly increased and the frequency is fast reduced. This mode can effectively reduce power consumption of the CPU.

In a possible implementation, how to adjust the frequency and voltage of the CPU may be comprehensively determined based on all performance parameters of the CPU. Correspondingly, processing may be as follows: entering the performance parameters and a current frequency and voltage of the CPU into a pre-trained feature extraction model, to obtain a to-be-classified feature data; entering the to-be-classified feature data into a pre-trained classifier model to obtain a current service type of the CPU; determining, based on a pre-stored correspondence between a service type and a configuration adjustment policy, a configuration adjustment policy corresponding to the current service type of the CPU, where the configuration adjustment policy includes at least a to-be-used frequency and a to-be-used voltage of the CPU; and respectively adjusting the frequency and voltage of the CPU to the to-be-used frequency and the to-be-used voltage.

The feature extraction model may be a long short-term memory (LSTM) autoencoder model, a recurrent neural network (RNN) model, or the like, and the classifier model may be a k-nearest neighbor (KNN) classification model, a multilayer perceptron (MLP) classification model, or the like.

During implementation, a person skilled in the art may pre-establish a feature extraction model and a classifier model, and train the feature extraction model and the classifier model. When the feature extraction model and the classifier model are trained, the two models may be simultaneously trained. A person skilled in the art may collect a plenty of CPU runtime performance parameters and CPU voltages and frequencies from the server as input samples, that is, each group of input samples includes at least a CPU runtime performance parameter and a CPU voltage and frequency. After the input samples are obtained, service classification may be manually performed on the input samples. For example, the input samples may be classified into 10 service types. A service type corresponding to each group of input samples is an output sample. In this way, each group of input samples and the corresponding output sample may form one group of training samples. The feature extraction model and the classifier model are trained by using a plenty of training samples, and parameters of the feature extraction model and the classifier model are continuously adjusted, so that accuracy of the feature extraction model and the classifier model are higher. Finally, a trained feature extraction model and classifier model may be obtained. For each service type, a person skilled in the art may perform energy efficiency scoring on CPU runtime performance parameters and CPU voltages and frequencies that correspond to the service type, and use a CPU voltage and frequency in a group with a highest energy efficiency score as a configuration adjustment policy corresponding to the service type. Then, each service type and the corresponding configuration adjustment policy are correspondingly stored. In this way, the configuration adjustment policy may be a to-be-used frequency and a to-be-used voltage of the CPU in the corresponding service type.

The IMU firmware may enter periodically obtained performance parameters of the CPU and the voltage and frequency of the CPU into the pre-trained feature extraction model and classifier model to obtain the corresponding target service type; then, query the correspondence between a service type and a configuration adjustment policy to obtain the configuration adjustment policy corresponding to the target service type, where the configuration adjustment policy includes the to-be-used frequency and the to-be-used voltage of the CPU; and then, may adjust the frequency of the CPU to the to-be-used frequency, and adjust the voltage of the CPU to the to-be-used voltage.

According to the power management method provided in this embodiment of this disclosure, the IMU firmware may obtain the IMU PM execution notification, to enable the IMU PM; and directly obtain the current performance parameter of the CPU, and adjust the frequency and voltage of the CPU based on the obtained performance parameter, to implement power management. In this process, the OS does not need to obtain the performance parameter and then notify the IMU firmware to adjust the frequency and voltage of the CPU. Therefore, interaction procedures are reduced, so that the frequency and the voltage are more efficiently adjusted.

The following describes a processing procedure of another power management method provided in an embodiment of this disclosure.

Figure 4:
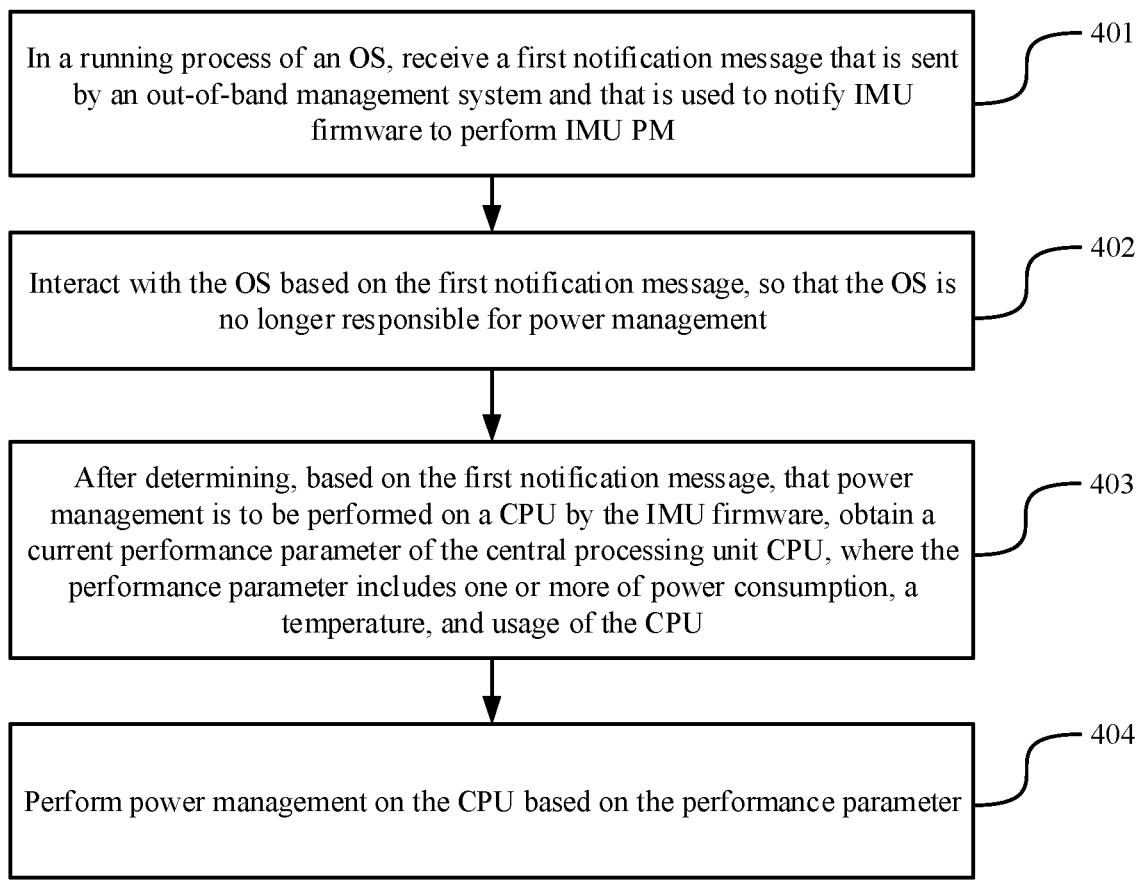
FIG. 4 is a schematic flowchart of a power management method according to an embodiment of this disclosure.

As shown in FIG. 4, a processing procedure of the method may include the following steps.

Step 401: In a running process of an OS, receive a first notification message that is sent by an out-of-band management system and that is used to notify IMU firmware to perform IMU PM.

Figure 5A:
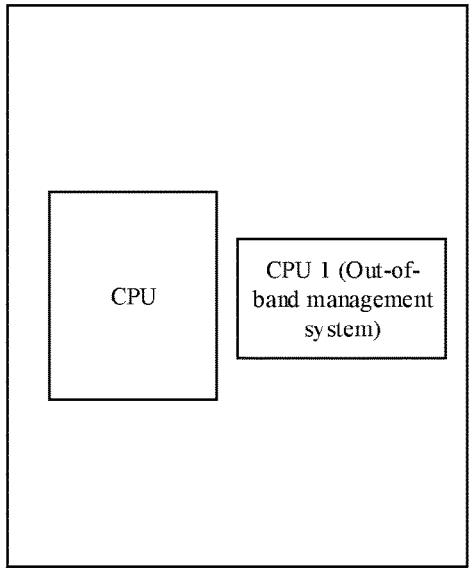
FIG. 5a and FIG. 5b are a schematic diagram of a structure of an out-of-band management system according to an embodiment of this disclosure.
Figure 5B:
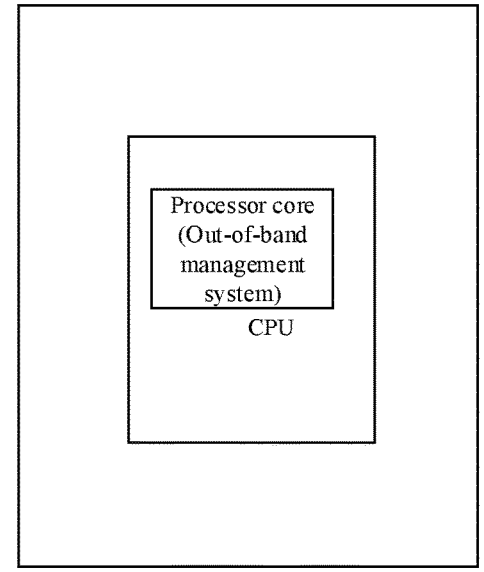

During implementation, if in the running process of the OS of a server, PM is performed by the OS, a user may enable the IMU PM by using the out-of-band management system of the server, so that the IMU firmware is responsible for the PM. The out-of-band management system may be a baseboard management controller (BMC). As shown in FIG. 5a, the out-of-band management system may be another CPU, namely, a CPU 1, in the server. As shown in FIG. 5b, the out-of-band management system may be alternatively a processor core in a CPU. The user may enter code for enabling the IMU PM into the out-of-band management system, and therefore the out-of-band management system sends the first notification message to the IMU firmware by using an intelligent platform management interface (IPMI), so that the IMU firmware performs IMU PM after receiving the first notification message.

Step 402: Interact with the OS based on the first notification message, so that the OS is no longer responsible for the power management.

During implementation, there may be a plurality of implementations in which the IMU firmware interacts with the OS, so that the OS is no longer responsible for the power management. The following lists several of the plurality of implementations for description.

Manner 1: if receiving a first power management request sent by the OS, returning a preset message to the OS instead of performing power management according to the first power management request, so that the OS is no longer responsible for the power management.

The first power management request may be a request for indicating, by the OS, the IMU firmware to perform frequency adjustment on the CPU.

In this manner, after receiving the first power management request, the IMU firmware does not perform the frequency adjustment operation corresponding to the first power management request, but performs IMU PM of the IMU firmware. In addition, although the IMU firmware does not perform frequency adjustment according to the first power management request, after receiving the first power management request, the IMU firmware may return the preset message to the OS. The preset message may be an execution success notification message, to deceive the OS, so that the OS considers that the OS is responsible for the PM, but actually the IMU firmware is responsible for the PM.

Manner 2: obtaining a fourth advanced configuration and power interface ACPI table, and updating the fourth ACPI table to obtain a fourth updated ACPI table; sending a fourth ACPI table update message to the OS, where the fourth ACPI table update message is used to indicate the OS to obtain the fourth updated ACPI table, so that the OS disables OS PM based on the fourth updated ACPI table.

In this manner, in order that the OS no longer performs OS PM, an ACPI table may be updated, so that the OS cannot perform power management based on the ACPI table. Herein, the IMU firmware may update the ACPI table by using a plurality of methods. The following lists several of the plurality of methods for description.

Method 1: removing a performance status table included in the fourth ACPI table, where the performance status table is a PSS table or a CPC table.

During implementation, the IMU firmware may obtain the ACPI table (namely, the fourth ACPI table) from a memory, remove a performance status table from the ACPI table, and then store an ACPI table obtained after the removal in an original storage address. In this way, after obtaining the ACPI table, the OS cannot obtain the performance status table through parsing, and therefore cannot perform OS PM.

Method 2: adjusting, to a same preset value, frequency adjustable values in a performance status table included in the fourth ACPI table.

During implementation, the frequency adjustable values in the performance status table are adjusted to the same preset value. For different performance status tables, the following cases may exist. When the performance status table is a PSS table, frequency adjustable values of all levels in the performance status table may be all adjusted to a same preset value. For example, the frequency adjustable values of all the levels are all adjusted to a frequency adjustable value of a P0 level, or the frequency adjustable values of all the levels may be all adjusted to any same preset value, for example, 0 MHz. When the performance status table is a CPC table, an upper limit and a lower limit of a frequency adjustable value of the CPU may be adjusted to a same preset value. For example, the upper limit of the frequency adjustable value may be adjusted to the lower limit of the frequency adjustable value, the lower limit of the frequency adjustable value may be adjusted to the upper limit of the frequency adjustable value, or the lower limit and the upper limit of the frequency adjustable value may be adjusted to any same preset value, for example, 0 MHz.

Method 3: modifying, into a value with an undefined range, a header of a performance status table included in the fourth ACPI table.

During implementation, alternatively, the header of the performance status table may be modified into the value with an undefined range, so that the OS cannot find a frequency adjustable value by using the header.

In a possible implementation, in the running process of the OS, the OS PM may be alternatively selected by using the out-of-band management system. Correspondingly, the IMU firmware may perform the following operations: in the running process of the operating system OS, receiving a second notification message that is sent by the out-of-band management system and that is used to notify the IMU firmware to enable the OS PM; and if the OS is currently responsible for the power management, skipping processing the second notification message; or if the OS is currently not responsible for the power management, interacting with the OS based on the second notification message, so that the OS is responsible for the power management.

During implementation, the user may enter code for enabling the OS PM into the out-of-band management system, and therefore the out-of-band management system may send the second notification message to the IMU firmware by using the IPMI. If current PM is the OS PM, the second notification message may not be processed. If current PM is the IMU PM, after the second notification message is received, the IMU PM needs to be disabled, and the OS is caused to be responsible for the PM, in other words, the OS PM is enabled.

For the foregoing different manners of causing the OS to be not responsible for the PM, herein, there also are different manners of interacting with the OS based on the second notification message, so that the OS is responsible for the power management.

For the foregoing manner 1, herein, after receiving the second notification message, after receiving a second power management request sent by the OS, the IMU firmware performs the second power management.

For the foregoing manner 2, herein, after receiving the second notification message, the IMU firmware obtains a fifth ACPI table, and updates the fifth ACPI table to obtain a fifth updated ACPI table; and sends a fifth ACPI table update message to the OS, where the fifth ACPI table update message is used to indicate the OS to obtain the fifth updated ACPI table, so that the OS can enable the OS PM based on the fifth updated ACPI table. Herein, the ACPI table may be updated in the following method:

if the fifth ACPI table does not include a performance status table, adding a performance status table to the fifth ACPI table; or if the fifth ACPI table includes a performance status table, adjusting, to a preset frequency adjustable value supported by the CPU, a frequency adjustable value in the performance status table included in the fifth ACPI table.

During implementation, if previous ACPI table updating performed when the OS is caused to be not responsible for the PM is removing a performance status table from an ACPI table, herein, the ACPI table (namely, the fifth ACPI table) may be obtained from the memory, and a normal performance status table may be added to the ACPI table. If previous ACPI table updating performed when the OS is caused to be not responsible for the PM is modifying a frequency adjustable value in an ACPI table without removing a performance status table, herein, a frequency adjustable value in the performance status table may be adjusted to a preset frequency adjustable value supported by the CPU. If previous ACPI table updating performed when the OS is caused to be not responsible for the PM is modifying a header without removing a performance status table, herein, a header of the performance status table may be adjusted to a header of a normal frequency adjustable value. After the ACPI table is updated, an updated ACPI table is stored in an original storage address.

The following describes a process in which the IMU firmware sends an ACPI table update message to the OS.

When acknowledging that a mailbox with the OS is empty, the IMU firmware writes an ACPI table update message into the mailbox, and simultaneously generates notify interrupt and feds back the notify interrupt to the OS. When receiving the notify interrupt or obtains the notify interrupt through polling, the OS processes the ACPI table update message in the mailbox, generates doorbell interrupt and sends the doorbell interrupt to the IMU firmware, and clears the notify interrupt. After receiving the doorbell interrupt returned by the OS, the IMU firmware acknowledges the doorbell interrupt of the OS, and clears the doorbell interrupt.

In addition, this embodiment of this disclosure further provides a data structure of a communication message sent between the IUM firmware and the OS. The communication message may be the ACPI table update message. The data structure is shown in the following Table 1.

TABLE 1

|   | Byte | Name |
| --- | --- | --- |
| Header | 1 | Command ID (command identifier) |
|  | 2 | Reserved |
|  | 3 | Payload size (data size) |
|  | 4 | Status |
| Payload (payload) | 1 |  |
|  | ... |  |
|  | 256 |  |

In the data structure, data carried in the payload may be shown in the following Table 2.

TABLE 2

| Byte | Name | Description |
| --- | --- | --- |
| 1 | PM | Power management policy<br>0: Reserved<br>1: OS PM<br>2: IMU PM |

The following describes Table 2. For the first byte in the payload, 1 is written at a byte 1, indicating that the PM is the OS PM; or 2 is written at a byte 1, indicating that the PM is the IMU PM.

Step 403: After determining, based on the first notification message, that power management is to be performed on the CPU by the IMU firmware, obtain a current performance parameter of the central processing unit CPU, where the performance parameter includes one or more of power consumption, a temperature, and usage of the CPU.

During implementation, the IMU firmware may obtain the performance parameter of the CPU, such as the power consumption, the temperature, and the usage.

For obtaining of the power consumption of the CPU:

After the IMU PM is enabled, the IMU firmware may periodically obtain the power consumption of the CPU. For example, a period may be 0.5 second. Alternatively, after the IMU PM is enabled, the IMU firmware may not immediately obtain the power consumption of the CPU, but the user determines whether frequency adjustment and voltage adjustment need to be performed on the CPU based on the power consumption of the CPU; and only when the user needs to perform frequency adjustment and voltage adjustment on the CPU based on the power consumption of the CPU, the IMU firmware periodically obtains the power consumption of the CPU. When the user needs to perform frequency adjustment and voltage adjustment on the CPU based on the power consumption of the CPU, the user may enter code for limiting the power consumption of the CPU into the out-of-band management system, and therefore the out-of-band management system may send a power consumption limiting instruction to the IMU firmware. The power consumption limiting instruction may carry a power consumption threshold. After receiving the power consumption limiting instruction, the IMU firmware obtains current power consumption of the CPU in real time.

For obtaining of the temperature of the CPU:

A temperature sensor may be installed in the CPU, the temperature sensor monitors the temperature of the CPU in real time, and the IMU firmware may periodically obtain a current temperature of the CPU from the temperature sensor. For example, a period may be 0.5 second. Alternatively, the temperature sensor may periodically monitor the temperature of the CPU, and only after the temperature reaches a temperature control threshold, the temperature sensor may send a current temperature of the CPU to the IMU firmware.

For obtaining of the usage of the CPU:

A performance monitor unit (PMU) may be installed in each core of the CPU, and the PMU is configured to count a quantity of clocks in which the core in which the PMU is located is in a non-idle state. For each statistics period, the PMU counts, in the statistics period, clocks in which the core in which the PMU is located is in the non-idle state, and sends a quantity of clocks to the IMU firmware. The IMU firmware may divide the quantity of clocks in the non-idle state by a total quantity of clocks in the statistics period, to obtain usage of the corresponding core in the statistics period. For a clock domain, average usage of cores in the clock domain is obtained by dividing a sum of usage of all the cores in the clock domain by a quantity of cores in the clock domain. For one CPU, only one clock domain may be set, that is, all cores are located in the same clock domain. In this case, usage of the CPU is average usage of the cores in the clock domain. Certainly, for one CPU, a plurality of clock domains may be alternatively disposed. For example, each core corresponds to one clock domain, or each several cores correspond to one clock domain. In this case, usage of the CPU may be jointly represented by average usage of cores in these clock domains.

Step 404: Perform power management on the CPU based on the performance parameter.

During implementation, the IMU firmware may adjust a frequency and voltage of the CPU based on different obtained performance parameters. The following describes adjusting the frequency and voltage of the CPU based on each obtained performance parameter.

For adjusting performed based on the power consumption of the CPU:

If the obtained current power consumption of the CPU is greater than the power consumption threshold sent by the out-of-band management system, the frequency of the CPU is reduced, or the voltage of the CPU may be further reduced while the frequency is reduced. In addition, power and a voltage of an IO interface of the CPU may be further reduced. If the frequency of the CPU has been adjusted to a lowest adjustable value, some unused ports of cores of the CPU may be disabled. If the power consumption of the CPU is less than a preset multiple of the power consumption threshold, the frequency and voltage of the CPU are increased. The preset multiple is greater than 0 and less than 1, such as 0.95. In addition, power and a voltage of the IO interface of the CPU may be further increased.

For adjusting performed based on the temperature of the CPU:

If the obtained current temperature of the CPU is greater than a first temperature threshold, a high temperature alarm message is sent to the out-of-band management system. After receiving the high temperature alarm message, the out-of-band management system performs power-off protection on the CPU to prevent the CPU from being damaged due to an excessively high temperature. If the temperature of the CPU is less than the first temperature threshold and is greater than a second temperature threshold, the frequency of the CPU is reduced, or the voltage of the CPU may be further reduced while the frequency is reduced. In addition, power and a voltage of an IO interface of the CPU may be further reduced, and a fan speed may be further increased to improve heat dissipation. If the temperature still cannot be effectively reduced, power domain statuses of cores in the CPU may be further adjusted, that is, power domains of some cores in an idle state are adjusted to be in a disabled state, in other words, these cores are disabled, so that the cores no longer run to generate heat. If the temperature of the CPU is less than a third temperature threshold, the frequency of the CPU may be increased, or the voltage of the CPU may be further increased while the frequency is increased. The third temperature threshold is less than the second temperature threshold. In addition, if power domains of some cores in the CPU are previously adjusted to be in the disabled state for cooling, in this case, the power domains of these cores may be adjusted to be in an enabled state, in other words, these cores are re-enabled.

For adjusting performed based on the usage of the CPU:

After average usage of cores in each clock domain is obtained, if the average usage is greater than a first usage threshold, frequencies of the cores in the clock domain may be increased, or voltages of the cores may be further increased while the frequencies are increased. If the average usage is less than a second usage threshold, frequencies of the cores in the clock domain may be reduced, or voltages of the cores may be further reduced while the frequencies are reduced. The first usage threshold is less than the second usage threshold.

It should be noted herein that the increasing or reducing the frequency of the CPU may be implemented by adjusting a phase-locked loop (PLL) of a clock domain corresponding to each core in the CPU. When the frequency of the CPU is adjusted by using the PLL, there may be the following several modes.

Mode 1: Fast-rise and slow-fall mode, that is, the frequency is fast increased and the frequency is slowly reduced. This mode can ensure performance of the CPU.

Mode 2: Slow-rise and fast-fall mode, that is, the frequency is slowly increased and the frequency is fast reduced. This mode can effectively reduce power consumption of the CPU.

In a possible implementation, how to adjust the frequency and voltage of the CPU may be comprehensively determined based on all performance parameters of the CPU. Correspondingly, processing may be as follows: entering the performance parameters and a current frequency and voltage of the CPU into a pre-trained feature extraction model, to obtain a to-be-classified feature data; entering the to-be-classified feature data into a pre-trained classifier model to obtain a current service type of the CPU; determining, based on a pre-stored correspondence between a service type and a configuration adjustment policy, a configuration adjustment policy corresponding to the current service type of the CPU, where the configuration adjustment policy includes at least a to-be-used frequency and a to-be-used voltage of the CPU; and respectively adjusting the frequency and voltage of the CPU to the to-be-used frequency and the to-be-used voltage.

The feature extraction model may be a long short-term memory (LSTM) autoencoder model, a recurrent neural network (RNN) model, or the like, and the classifier model may be a k-nearest neighbor (KNN) classification model, a multilayer perceptron (MLP) classification model, or the like.

During implementation, a person skilled in the art may pre-establish a feature extraction model and a classifier model, and train the feature extraction model and the classifier model. When the feature extraction model and the classifier model are trained, the two models may be simultaneously trained. A person skilled in the art may collect a plenty of CPU runtime performance parameters and CPU voltages and frequencies from the server as input samples, that is, each group of input samples includes at least a CPU runtime performance parameter and a CPU voltage and frequency. After the input samples are obtained, service classification may be manually performed on the input samples. For example, the input samples may be classified into 10 service types. A service type corresponding to each group of input samples is an output sample. In this way, each group of input samples and the corresponding output sample may form one group of training samples. The feature extraction model and the classifier model are trained by using a plenty of training samples, and parameters of the feature extraction model and the classifier model are continuously adjusted, so that accuracy of the feature extraction model and the classifier model are higher. Finally, a trained feature extraction model and classifier model may be obtained. For each service type, a person skilled in the art may perform energy efficiency scoring on CPU runtime performance parameters and CPU voltages and frequencies that correspond to the service type, and use a CPU voltage and frequency in a group with a highest energy efficiency score as a configuration adjustment policy corresponding to the service type. Then, each service type and the corresponding configuration adjustment policy are correspondingly stored. In this way, the configuration adjustment policy may be a to-be-used frequency and a to-be-used voltage of the CPU in the corresponding service type.

The IMU firmware may enter periodically obtained performance parameters of the CPU and the voltage and frequency of the CPU into the pre-trained feature extraction model and classifier model to obtain the corresponding target service type; then, query the correspondence between a service type and a configuration adjustment policy to obtain the configuration adjustment policy corresponding to the target service type, where the configuration adjustment policy includes the to-be-used frequency and the to-be-used voltage of the CPU; and then, may adjust the frequency of the CPU to the to-be-used frequency, and adjust the voltage of the CPU to the to-be-used voltage.

According to the power management method proposed in this embodiment of this disclosure, the IMU firmware may obtain the IMU PM execution notification, to enable the IMU PM; and directly obtain the current performance parameter of the CPU, and adjust the frequency and voltage of the CPU based on the obtained performance parameter, to implement power management. In this process, the OS does not need to obtain the performance parameter and then notify the IMU firmware to adjust the frequency and voltage of the CPU. Therefore, interaction procedures are reduced, so that the frequency and the voltage are more efficiently adjusted.

Figure 6:
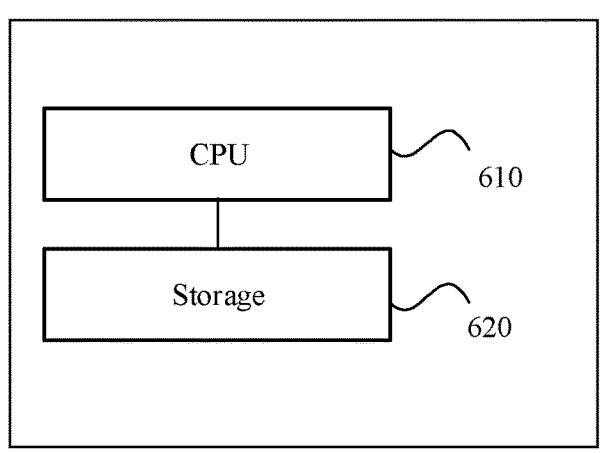
FIG. 6 shows a power management device according to an embodiment of this disclosure.

An embodiment of this disclosure further provides a power management device. As shown in FIG. 6, the device may include a CPU 610 and a storage 620, the storage 620 stores a plurality of program instructions respectively corresponding to boot firmware, an OS, and IMU firmware, the plurality of program instructions are read and executed by the CPU to implement functions of the boot firmware, the OS, and the IMU firmware. The IMU firmware may be configured to perform a power management method.

In a possible implementation, the CPU 610 may be the CPU in FIG. 2. It may be learned that the CPU includes an IMU core and an AP core. To ensure security of data in the IMU core, the IMU core may be isolated from the AP core by using a system isolation wall SIW. A function of the IMU firmware may be processed by the IMU core.

In addition, it should be noted that, when the IMU firmware performs the power management method, specific implementations are the same as those in the foregoing power management method embodiments. Details are not described herein again.

The foregoing description is merely an embodiment of this disclosure, but is not intended to limit this disclosure. Any modification, equivalent replacement, or improvement made without departing from the spirit and principle of this disclosure shall fall within the protection scope of this disclosure.

What is claimed is:

1. A power management method performed by a central processing unit (CPU) of a device, the CPU configured to receive and execute program instruction stored in a storage of the device, the computer instructions including instructions for boot firmware, an operating system (OS), and intelligent management unit (IMU) firmware, the method comprises:
    obtaining an intelligent management unit power management (IMU PM) execution notification before the operating system OS runs, wherein the IMU PM execution notification is sent by the boot firmware after the boot firmware determines, before the OS runs, that power management (PM) is to be performed by the IMU firmware, and the boot firmware is further configured to prevent, before the OS runs, the OS from performing operating system power management (OS PM);
    after determining, based on the IMU PM execution notification, that PM is to be performed on the CPU by the IMU firmware, obtaining a current performance parameter of the CPU, wherein the performance parameter comprises one or more of power consumption, a temperature or usage of the CPU; and
    performing power management on the CPU based on the performance parameter by entering a performance parameter into a trained feature extraction model to obtain a target service type to determine a configuration adjustment policy that corresponds to the target service type.

2. The method according to claim 1, wherein the IMU PM execution notification is first preset data in a preset storage address, and the obtaining an IMU PM execution notification comprises:
obtaining the first preset data by polling the preset storage address.

3. The method according to claim 2, wherein the method further comprises: after the boot firmware determines, before the OS runs, that PM is to be performed by the OS, the boot firmware performs the following operations:
creating first advanced configuration and power interface (ACPI) table, and sending the first ACPI table to the OS; and
writing second preset data into the preset storage address; and
the IMU firmware further performs the following operations:
obtaining the second preset data by polling the preset storage address, and disabling IMU PM.

4. The method according to claim 1, wherein the boot firmware is configured to prevent, by using the following method before the OS runs, the OS from performing OS PM:
creating a second ACPI table, and reporting the second ACPI table to the OS, wherein the second ACPI table does not comprise a performance status table, to prevent the OS from performing OS PM, and the performance status table is a performance support status (PSS) table or a continuous performance control (CPC) table.

5. The method according to claim 1, wherein the boot firmware is configured to prevent, by using the following method before the OS runs, the OS from performing OS PM:
creating a third ACPI table, and reporting the third ACPI table to the OS, wherein the third ACPI table comprises a performance status table, and frequency adjustable values in the performance status table comprised in the third ACPI table are a same preset value, or a header of the performance status table comprised in the third ACPI table is a value with an undefined range, to prevent the OS from performing OS PM.

6. The method according to claim 1, wherein the method further comprises: after the boot firmware determines, before the OS runs, that PM is to be performed by the OS, the boot firmware performs the following operations:
creating a first ACPI table, and sending the first ACPI table to the OS, wherein the first ACPI table comprises a performance status table, and a frequency adjustable value in the performance status table comprised in the first ACPI table is a preset frequency adjustable value supported by the CPU, to enable the OS to perform OS PM; and
sending an IMU PM disable instruction to the IMU firmware; and
the IMU firmware further performs the following operations:
receiving the IMU PM disable instruction sent by the boot firmware, and disabling IMU PM.

7. The method according to claim 1, wherein the boot firmware is basic input/output system (BIOS) firmware or unified extensible firmware interface (UEFI) firmware.

8. The method according to claim 1, wherein the performing power management on the CPU based on the performance parameter further comprises:
entering the performance parameter and a current frequency and voltage of the CPU into a pre-trained feature extraction model, to obtain to-be-classified feature data;
entering the to-be-classified feature data into a pre-trained classifier model, to obtain a target service type;
determining, based on a pre-stored correspondence between a service type and a configuration adjustment policy, a configuration adjustment policy corresponding to the target service type, wherein the configuration adjustment policy comprises at least a to-be-used frequency and a to-be-used voltage of the CPU; and
respectively adjusting the frequency and voltage of the CPU to the to-be-used frequency and the to-be-used voltage.

9. A power management method, used for power management of an electronic device, wherein the electronic device comprises a central processing unit (CPU) and a storage, the storage stores a plurality of program instructions respectively corresponding to boot firmware, an operating system (OS), and intelligent management unit (IMU) firmware, the plurality of program instructions are read and executed by the CPU to implement functions of the firmware, the OS, and the IMU firmware, and the power management method is performed by the IMU firmware and comprises:
in a running process of the OS, receiving a first notification message that is sent by an out-of-band management system and that is used to notify the IMU firmware to perform intelligent management unit power management (IMU PM);
interacting with the OS based on the first notification message, to enable the OS to be no longer responsible for the power management;
obtaining a current performance parameter of the CPU, wherein the performance parameter comprises one or more of power consumption, a temperature, and usage of the CPU; and
performing power management on the CPU based on the performance parameter by entering a performance parameter into a trained feature extraction model to obtain a target service type to determine a configuration adjustment policy that corresponds to the target service type.

10. The method according to claim 1, wherein the IMU PM execution notification is an IMU PM execution instruction, and the obtaining an IMU PM execution notification comprises:
receiving the IMU PM execution instruction sent by the boot firmware.

11. The method according to claim 9, wherein the interacting with the OS based on the first notification message, to enable the OS to be no longer responsible for the power management comprises:
after receiving the first notification message, if receiving a first power management request sent by the OS, returning a preset message to the OS instead of performing power management based on the first power management request, to enable the OS to be no longer responsible for the power management.

12. The method according to claim 9, wherein the interacting with the OS based on the first notification message comprises:
after receiving the first notification message, obtaining a first advanced configuration and power interface (ACPI) table, and updating the first ACPI table to obtain a first updated ACPI table; and sending a first ACPI table update message to the OS, wherein the first ACPI table update message is used to indicate the OS to obtain the first updated ACPI table, to enable the OS to disable OS PM based on the first updated ACPI table.

13. The method according to claim 12, wherein the updating the first ACPI table comprises:

removing a performance status table comprised in the first ACPI table, wherein the performance status table is a performance support status (PSS) table or a continuous performance control (CPC) table;

adjusting, to a same preset value, frequency adjustable values in a performance status table comprised in the first ACPI table; or modifying, into a value with an undefined range, a header of a performance status table comprised in the first ACPI table.

14. The method according to claim 10, wherein the IMU firmware further performs the following operations:

in the running process of the operating system OS, receiving a second notification message that is sent by the out-of-band management system and that is used to notify the IMU firmware to enable OS PM; and if the OS is currently responsible for the power management, skipping processing the second notification message; or if the OS is currently not responsible for the power management, interacting with the OS based on the second notification message, to enable the OS to be responsible for the power management.

15. The method according to claim 14, wherein the interacting with the OS based on the second notification message, to enable the OS to be responsible for the power management comprises:

after receiving a second power management request sent by the OS, performing the second power management request.

16. The method according to claim 14, wherein the interacting with the OS based on the second notification message, to enable the OS to be responsible for the power management comprises:

obtaining a second ACPI table, and updating the second ACPI table to obtain a second updated ACPI table; and sending a second ACPI table update message to the OS, wherein the second ACPI table update message is used to indicate the OS to obtain the second updated ACPI table, to enable the OS to enable the operating system power management OS PM based on the second updated ACPI table.

17. The method according to claim 16, wherein the updating the second ACPI table comprises:

if the second ACPI table does not comprise a performance status table, adding the performance status table to the second ACPI table; or if the second ACPI table comprises a performance status table, adjusting, to a preset frequency adjustable value supported by the CPU, a frequency adjustable value in the performance status table comprised in the second ACPI table.

18. The method according to claim 9, wherein the performing power management on the CPU based on the performance parameter further comprises:

entering the performance parameter and a current frequency and voltage of the CPU into a pre-trained feature extraction model, to obtain to-be-classified feature data;

entering the to-be-classified feature data into a pre-trained classifier model, to obtain a target service type;

determining, based on a pre-stored correspondence between a service type and a configuration adjustment policy, a configuration adjustment policy corresponding to the target service type, wherein the configuration adjustment policy comprises at least a to-be-used frequency and a to-be-used voltage of the CPU; and respectively adjusting the frequency and voltage of the CPU to the to-be-used frequency and the to-be-used voltage.

19. A power management device, wherein the device comprises a CPU and a storage, the storage stores a plurality of program instructions respectively corresponding to boot firmware, an operating system (OS), and intelligent management unit (IMU) firmware, and the plurality of program instructions are read and executed by the CPU to implement functions of the boot firmware, the OS, and the IMU firmware; and the IMU firmware is configured to perform the power management method that includes the steps of:

in a running process of the OS, receiving a first notification message that is sent by an out-of-band management system and that is used to notify the IMU firmware to perform intelligent management unit power management (IMU PM);

interacting with the OS based on the first notification message, to enable the OS to be no longer responsible for the power management;

obtaining a current performance parameter of the CPU, wherein the performance parameter comprises one or more of power consumption, a temperature, and usage of the CPU; and performing power management on the CPU based on the performance parameter by entering a performance parameter into a trained feature extraction model to obtain a target service type to determine a configuration adjustment policy that corresponds to the target service type.

20. The device according to claim 19, wherein the CPU comprises an IMU core and an application processor (AP) core, and the AP core is isolated from the IMU core by using a system isolation wall (SIW); and a function of the IMU firmware is processed by the IMU core.

* * * * *